(12) United States Patent
Hustava et al.

(10) Patent No.: US 11,899,106 B1
(45) Date of Patent: Feb. 13, 2024

(54) DUAL-CHANNEL ACOUSTIC DISTANCE MEASUREMENT CIRCUIT AND METHOD

(71) Applicant: SEMICONDUCTOR COMPONENTS INDUSTRIES, LLC, Phoenix, AZ (US)

(72) Inventors: Marek Hustava, Bratislava (SK); Pavel Kostelnik, Bordovice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/938,191

(22) Filed: Oct. 5, 2022

(51) Int. Cl.
  *G01S 15/931* (2020.01)
  *G01S 7/526* (2006.01)
  *B60Q 9/00* (2006.01)

(52) U.S. Cl.
  CPC ........... *G01S 15/931* (2013.01); *G01S 7/526* (2013.01); *B60Q 9/008* (2013.01)

(58) Field of Classification Search
  CPC .. G01S 15/931; G01S 15/93; G01S 2015/932; G01S 2015/937; G01S 2015/933; G01S 2015/934; G01S 2015/935; G01S 2015/936; G01S 2015/938; G01S 2015/939; G01S 15/02; G01S 15/86; G01S 15/874; G01S 15/876; G01S 7/526; G01S 7/539; G01S 7/54; G01S 7/56; G01S 7/58; G01S 7/53; G01S 7/531; G01S 7/533; G01S 2013/9324; G01S 2013/932; G01S 19/45; G01S 2007/52014; B60Q 5/006; B60Q 9/008; B60Q 9/002; B60Q 9/004; B60Q 9/007; B60Q 9/006; B60Q 9/005

USPC .......................................................... 367/118
See application file for complete search history.

(56) References Cited

U.S. PATENT DOCUMENTS

| 10,444,350 B2 | 10/2019 | Hustava et al. | |
| 2005/0046584 A1* | 3/2005 | Breed ................... | G06F 3/0237 340/13.31 |
| 2006/0025897 A1* | 2/2006 | Shostak ................ | G08G 1/017 701/1 |
| 2006/0284839 A1* | 12/2006 | Breed ................... | B60W 50/16 345/156 |

(Continued)

FOREIGN PATENT DOCUMENTS

EP  1231481 A2  8/2022

*Primary Examiner* — Daniel L Murphy
*Assistant Examiner* — Amie M Ndure
(74) *Attorney, Agent, or Firm* — Polansky & Associates, P.L.L.C.; Paul J. Polansky

(57) ABSTRACT

An acoustic distance measurement circuit includes a transmitter, a receiver, and a controller. The transmitter has an output adapted to be coupled to an acoustic transducer for providing a selected one of an amplitude-modulation (AM) signal in an AM mode and a chirp signal in a chirp mode. The receiver has an input adapted to be coupled to the acoustic transducer, and an output for providing a digital received signal. The controller is operative during a first measurement period to: place the transmitter into one of the AM mode and the chirp mode using a first channel, selectively detect a direct echo in the first channel of the digital received signal of the one of the AM signal and the chirp signal, and selectively detect an indirect echo in a second channel of the digital received signal of another one of the AM signal and the chirp signal.

24 Claims, 8 Drawing Sheets

(56) References Cited

U.S. PATENT DOCUMENTS

| | | | |
|---|---|---|---|
| 2007/0182528 A1* | 8/2007 | Breed | B60W 30/16 |
| | | | 348/148 |
| 2011/0095940 A1* | 4/2011 | Breed | B60R 21/01536 |
| | | | 342/146 |
| 2016/0154104 A1* | 6/2016 | Schumann | G01S 15/52 |
| | | | 367/91 |
| 2019/0212423 A1* | 7/2019 | Hustava | G01S 15/931 |
| 2021/0352412 A1* | 11/2021 | Suchy | G01S 7/529 |

* cited by examiner

DUAL-CHANNEL ACOUSTIC DISTANCE MEASUREMENT CIRCUIT AND METHOD

FIELD OF THE DISCLOSURE

This disclosure relates generally to electrical and electronic circuits, and more specifically to acoustic distance measurement circuits.

BACKGROUND

Acoustic distance measurement systems can be used in a variety of applications. For example, acoustic measuring systems are used in parking assist sensors (PAS) for automobiles. PAS sensors detect the presence of an object within a range of distances from the automobile, and signal the user to potentially take corrective action. In general, acoustic measurement systems first transmit acoustic energy through sounds waves, and then measure the elapsed time until an echo is detected. The elapsed time is known as the time of flight, and is proportional to the distance between the automobile and the obstacle. Automotive applications that utilize acoustic distance measurement systems require reliable detection of the presence of obstacles within a broad measurement range, such as from a few centimeters to several meters. Currently, single modulation acoustic measuring sensors provide reliable detection at a short distances or long distances, but not both, based on the type of acoustic signal used.

For example, acoustic sensors can use amplitude modulated (AM) acoustic pulses that provide good detection at short distances, but have limited long-distance detection capabilities. The limited long-distance detection arises from a variety of factors. First, the sensitivity of common piezoelectric transducers is limited, preventing the detection of dissipated AM echo signals reflected off far-away objects. Second, the transducers themselves have limited bandwidths, and AM signals are susceptible to phasing phenomena. For example, phasing can occur due to overlapping echoes from complex objects, gravel, etc. causing interference. Third, AM signals are susceptible to limited beaming durations, such as 500 microseconds (μs), which limits the amount of transmitted energy and therefore the maximum distance at which an echo can be reliably detected. Because of these problems, AM signals, even when used with multiple channels, can detect objects only at distances of around 3.6 meters (m) or less.

On the other hand, acoustic sensors can use chirps instead of AM signals to achieve better long-range obstacle detection. A chirp is an electrical signal in which a frequency of the signal changes or sweeps over a period of time. Chirp-based systems have problems detecting objects at shorter distances. The minimum distance that a chirp sensor can detect the presence of an obstacle is limited by two factors. First, a high-quality transducer is required to match the surface impedance of the transducer with the surrounding air. However, the high-quality transducer still has a lot of energy remaining after the end the beaming period, which prolongs the reverberation period and increases the minimum distance at which the sensor is able to detect an obstacle. Second, in order to achieve object detection at a more desirable long-range distance of 5 m, for example, the vehicle must drive the transducer with a lot of energy, which also lengthens the reverberation time and increases the minimum detectable distance.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
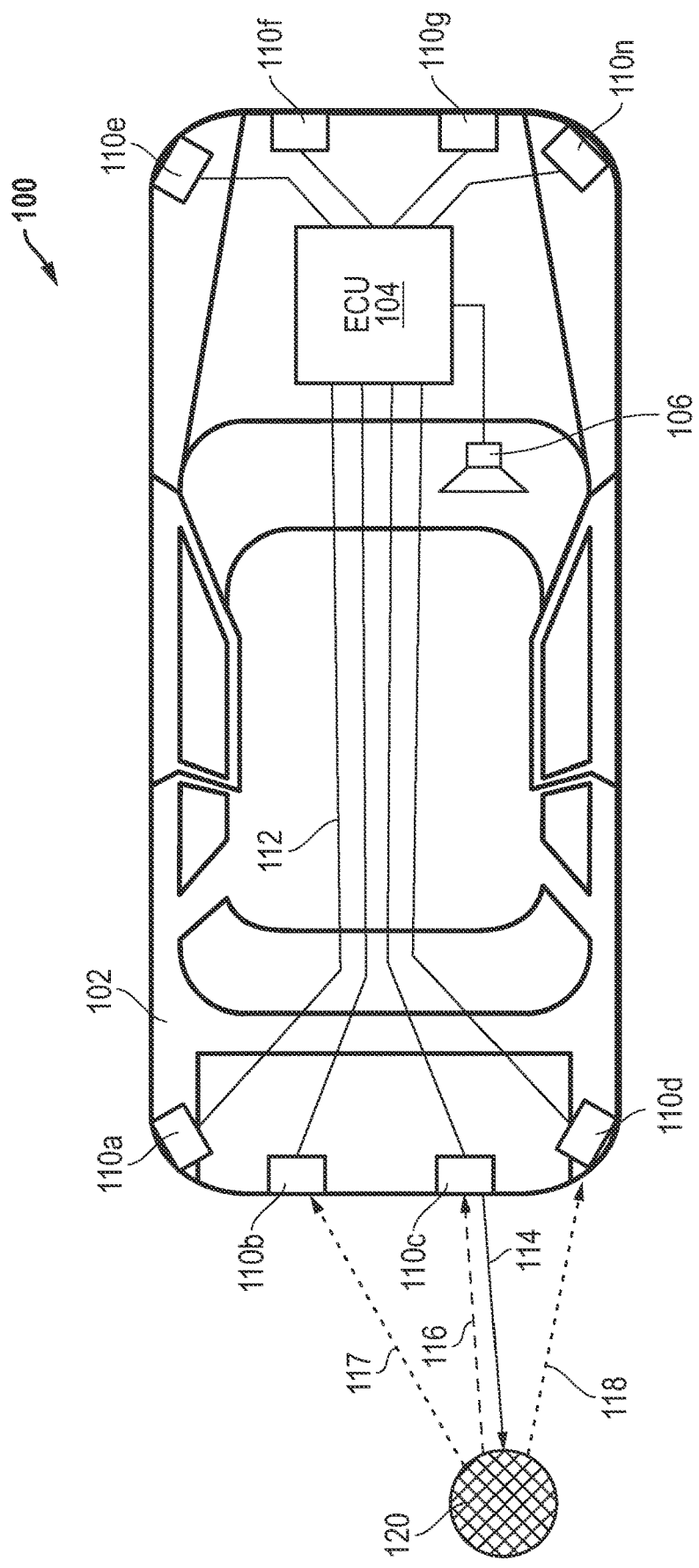
FIG. 1 illustrates in block diagram form an acoustic distance measurement system according to various embodiments of the present disclosure.

FIG. 1 illustrates in block diagram form an acoustic distance measurement system 100 according to various embodiments of the present disclosure. Acoustic distance measurement system 100 includes generally an automobile 102 and an obstacle 120.

Automobile 102 includes an engine control unit (ECU) 104, a loudspeaker 106, a set of conductors 112, and a set of acoustic sensor modules 110. A system controller, such as ECU 104, is situated on or within automobile 102, and provides an electrical alert signal that causes loudspeaker 106 to output an audible alert to the driver to signal the presence and relative distance of an obstacle 120 in relation to the rear bumper of automobile 102. For example, ECU 104 could signal the relative distance with the speed of beeps, and if the rear bumper is within a certain distance of the read bumper, provide s continuous tone to alert the driver of the need to stop automobile 102 immediately. In other embodiments, ECU could be replaced by a body control unit (BCU), an infotainment system controller, or like controller that would be able to interact with the driver.

ECU 104 also has outputs connected to acoustic sensor modules 110, and inputs for receiving obstacle position information from acoustic sensor modules 110. Each of acoustic sensor modules 110 emits an ultrasonic acoustic signal as described herein that reflects off of obstacle 120 when obstacle 120 is within the range of measurement between the rear bumper of automobile 102 and obstacle 120. Each acoustic sensor module 110 also receives reflected signals, also known as echo, processes them, and provides output signals to ECU 104. ECU 104 determines the time-of-flight and thus the distance from these signals.

In the illustrated embodiment, automobile 102 has four acoustic sensor modules on its rear bumper including an acoustic sensor module 110a, an acoustic sensor module 110b, an acoustic sensor module 110c, and an acoustic sensor module 110d. Each acoustic sensor module 110 is capable of emitting an acoustic pulse and receiving echoes from its or its neighbors' transmissions. In the example shown in FIG. 1, acoustic sensor module 110c emits an acoustic signal 114, and receives an echo 116 from obstacle 120. Echo 116 is known as a direct echo signal because it is reflected directly back along the same path as acoustic signal 114, and the time between the emission of acoustic signal 114 and the reception of echo 116 corresponds to the distance between acoustic sensor module 110c on the rear bumper of automobile 102 and obstacle 120.

However, acoustic signal 114 also produces other echo including an echo 117 that is received by acoustic sensor module 110b and an echo 118 that is received by acoustic sensor module 110d. Echoes 117 and 118 are known as indirect echo signals because they are reflected indirectly along different paths to neighboring sensors. Since echoes 117 and 118 travel by indirect paths, they travel longer distances but also reflect the distance between the rear bumper and obstacle 120. A more accurate distance measurement between the rear bumper of automobile 102 and obstacle 120 can be determined by triangulating the three signals based on the known and fixed physical separations between acoustic sensor modules 110b, 110c, and 110d.

According to various embodiments described herein, an acoustic distance measurement system uses these characteristics of direct and indirect measurement to achieve both accurate short-range obstacle detection and accurate long-range obstacle detection. In addition, it uses different and complementary properties of different types of sensors to measure the presence of low-height objects such as a very low curb that tends to obscure a high-height object such as a pole behind it. Both of these capabilities will be described in detail below.

Figure 2:
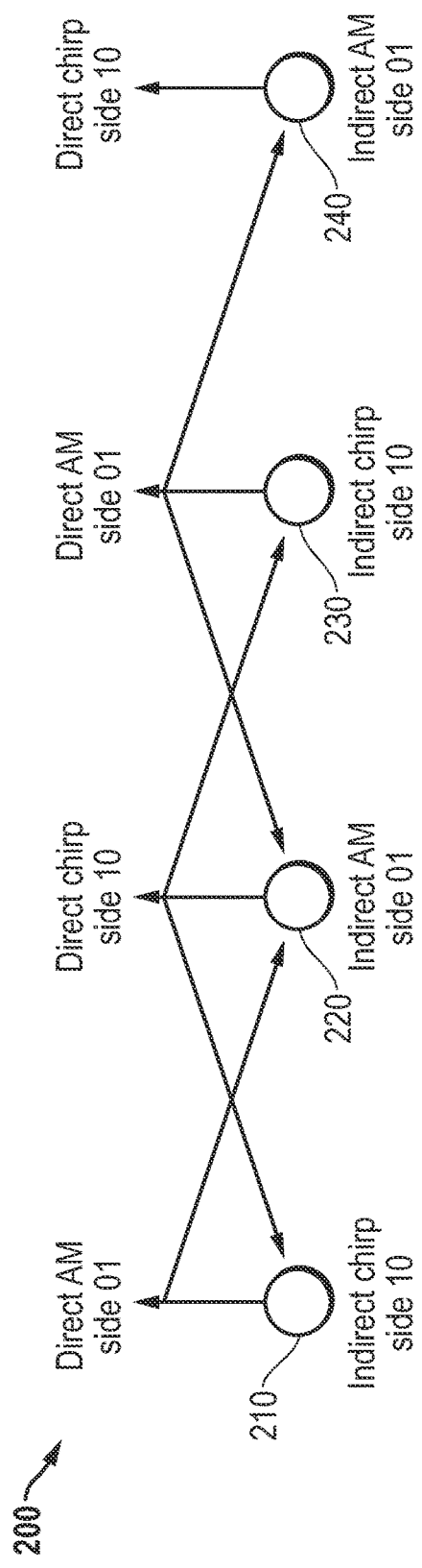
FIG. 2 illustrates in block diagram form a dual-channel acoustic distance measurement system according to various embodiments of the present disclosure.

FIG. 2 illustrates in block diagram form a dual-channel acoustic distance measurement system 300 according to various embodiments of the present disclosure. Dual-channel acoustic distance measurement system 200 includes acoustic sensor modules 210, 220, 230, and 240 illustrated as circles and corresponding to, for example, acoustic sensor modules 110d, 110c, 110b, and 110a, respectively, shown in FIG. 1. As shown in FIG. 2, acoustic sensor module 210 transmits an AM signal from a low-frequency channel labelled "01" and senses the direct echo of the AM signal and an indirect chirp signal from a high-frequency channel labelled "10" transmitted by acoustic sensor module 220. Acoustic sensor module 220 transmits a chirp signal on the high-frequency channel and senses a direct echo of the chirp signal and an indirect echo of the AM signal on the low-frequency channel transmitted by each of acoustic sensor modules 210 and 230. Acoustic sensor module 230 transmits an AM signal on the low channel and senses a direct echo of the AM signal and an indirect echo of the chirp signal transmitted by acoustic sensor module 220. Acoustic sensor module 240 transmits a chirp signal on the high channel and senses a direct echo of the chirp signal and an indirect echo of the AM signal sent by acoustic sensor module 230.

The inventors have discovered that a low-frequency AM signal can accurately measure short distances down to about 16 cm, but cannot provide accurate sensing of obstacles beyond about 3 m. On the other hand, the high-frequency chirp signal can accurately detect the presence of obstacles at short distances down to 16 cm, but cannot accurately determine their distances, and can pinpoint the location of obstacles at distances up to about 5 m.

Dual-channel acoustic distance measurement system 200 simultaneously uses two types of acoustic signals each provided on one of two channels to provide more accurate detection of obstacles over a wider range of distances. In particular, dual-channel acoustic distance measurement system 200 simultaneously transmits on two channels, in the illustrated embodiment a low-frequency AM signal channel and a high-frequency chirp signal channel, using alternating piezoelectric transducers along the rear bumper of an automobile. Dual-channel acoustic distance measurement system 200 uses the chirp signal to detect the presence of obstacles at short distances, while using the AM signal to pinpoint their location, providing fast and accurate detection of obstacles down to about 16 cm, which is shorter than known systems. Dual-channel acoustic distance measurement system 200 also uses AM distances measured by two sensors to triangulate the position and distance of obstacles with respect to, for example, the rear bumper of an automobile.

Dual-channel acoustic distance measurement system 200 also uses chirp signals to measure the distance of obstacles at longer distances. Like the AM signals, it uses distances measured by two sensors to triangulate the exact position of an obstacle with respect to, for example, the read bumper of the automobile.

As can be seen from FIG. 2, the rear bumper of the automobile uses a pattern of sensors that alternate between AM and chirp acoustic signal transmissions and between low- and high-frequencies. Each transducer fires (i.e., it transmits an acoustic signal) and measures the echo signal on its respective channel in a given mode. During an indirect measurement period, each transducer fires and measures the indirect signals received in the opposite mode. To measure an echo produced by signal reflections off an obstacle up to about 5 m from the rear bumper, each period lasts about 40 milliseconds (ms), accounting for the time from the start to the end of the transmission and the round-trip flight time of the acoustic signal at the longest measurable distance.

Dual-channel acoustic distance measurement system 200 uses data from consecutive, alternating dual AM and dual chirp measurements to obtain a precise measurement down to a closer distance than would be obtained in dual chirp mode alone. A chirp signal alone cannot provide accurate distance if the object is detected below about 28 cm. However, if a dual chirp signal detects that an obstacle is present below about 28 cm, then a consecutive dual AM signal can provide an accurate measured distance well below about 28 cm. In particular, the inventors discovered that by using the dual-sensor detection technique, distances as low as about 16 cm are attainable.

Similarly, dual-channel acoustic distance measurement system 300 also uses data from consecutive, alternating dual AM and dual chirp measurements to obtain a precise measurement up to a farther distance than would be obtainable in dual AM mode alone. An AM signal alone cannot provide accurate distance if the object is detected above about 3.6 m. However, if an AM signal detects that an obstacle is present above about 3.6 m, then a consecutive dual chirp signal can provide an accurate measured distance well above about 3.6 m. In particular, the inventors discovered that by using the dual-sensor detection technique, distances as high as about 5 m can be accurately measured. Therefore, by using dual AM/dual chirp measurements, an obstacle can be detected in an overall range from about 16 cm to about 5 m.

Sequential direct and indirect measurements can also be used to detect low-height objects. For example, dual-channel acoustic distance measurement system 300 can detect a low curb that is 9 cm high, even in the presence of background objects, such as a 20 cm diameter pole 50 cm behind the curb.

Figure 3:
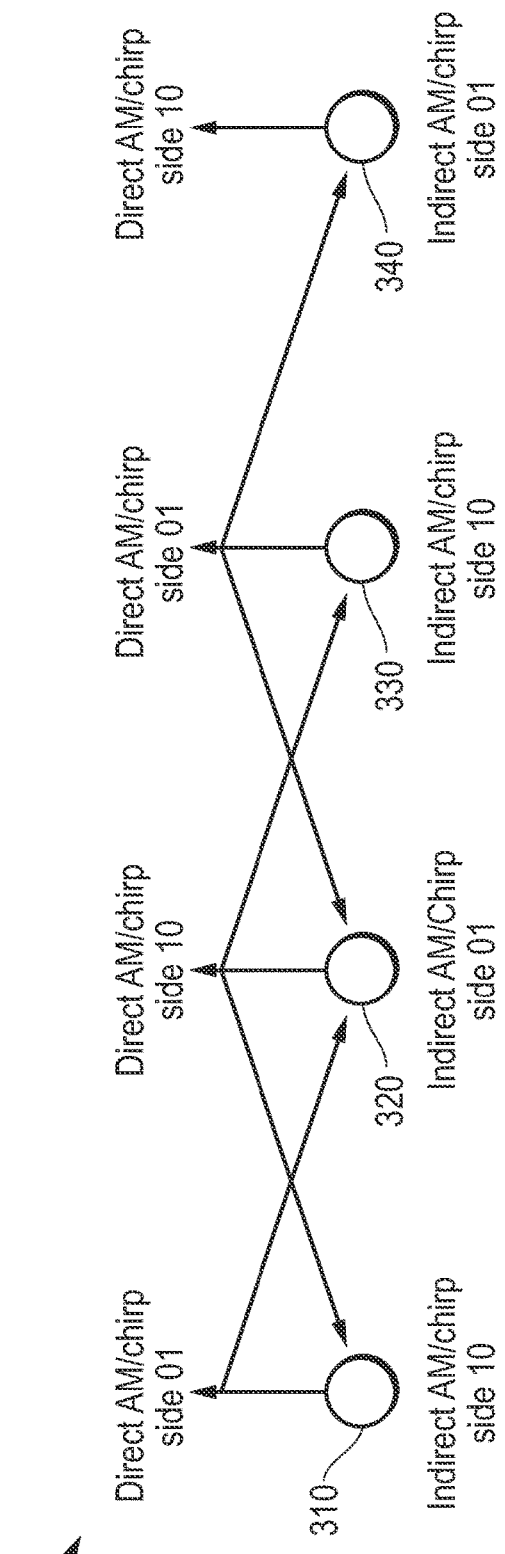
FIG. 3 illustrates in block diagram form a dual-channel acoustic distance measurement system according to various embodiments of the present disclosure.

FIG. 3 illustrates in block diagram form a dual-channel acoustic distance measurement system 300 using a combination of amplitude modulation signals and chirp signals. Dual-channel acoustic distance measurement system 300 includes acoustic sensor modules 310, 320, 330, and 340 illustrated as circles and corresponding to, for example, acoustic sensor modules 110*d*, 110*c*, 110*b*, and 110*a*, respectively, at the rear bumper as shown in FIG. 1. Dual-channel acoustic distance measurement system 300 has a first measurement period in which it transmits and then senses AM signals on both the low- and high-channels. Thus, as shown in FIG. 3, acoustic sensor modules 310 and 330 transmit AM signals on the low (01) channel, and acoustic sensor modules 320 and 340 transmit AM signals on the high (10). Similarly, dual-channel acoustic distance measurement system 300 has a second measurement period in which it transmits and then senses chirp signals on both the low and the high channels. It uses each transducer to measure both direct and indirect echoes, and combines these measurements to detect the presence of a low-height object (such as a curb), and possibly a high-height object (such as a pole) behind the curb.

In particular, in the first measurement period, acoustic sensor module 310 transmits an AM signal on the low channel and receives an acoustic signal after the end of the reverberation period. It detects echoes of the direct AM signal on the low (01) channel and echoes of the indirect AM signal on the high (10) channel received from acoustic sensor module 320 using digital processing on the received acoustic signal. Acoustic sensor module 310 analyzes the acoustic signal in the digital domain to look for echoes from which the presence of objects and their times-of-flight can be determined. Acoustic sensor module 320 transmits an AM signal on the high (10) channel and receives an acoustic signal after the end of the reverberation period. It detects echoes of the direct AM signal on the high (10) channel and echoes of the AM signal on the low (01) channel received indirectly from acoustic sensor modules 310 and 330. Acoustic sensor module 330 transmits an AM signal on the high channel and receives an acoustic signal after the end of the reverberation period. It detects echoes of the direct AM signal on the low (01) channel and echoes of the indirect AM signal on the high (10) channel received from acoustic sensor module 320 using digital processing on the received acoustic signal. Acoustic sensor module 340 transmits an AM signal on the low channel and receives an acoustic signal after the end of the reverberation period. It detects echoes of the direct AM signal on the low (01) channel and echoes of the indirect AM signal on the high (10) channel received from acoustic sensor module 320 using digital processing on the received acoustic signal.

In the second measurement period, the acoustic sensor modules transmit opposite-mode signals. Acoustic sensor module 310 transmits a chirp signal on the low channel and receives and analyzes an acoustic signal after the end of the reverberation period. It detects direct echoes of the chirp signal on the low (01) channel and indirect echoes of the chirp signal on the high (10) channel received from acoustic sensor module 320 using digital processing on the received acoustic signal. Acoustic sensor module 310 analyzes the acoustic signal in the digital domain to look for echoes from which the presence of objects and their times of flight can be determined. Acoustic sensor module 320 transmits a chirp signal on the high (10) channel and receives an acoustic signal after the end of the reverberation period. It detects direct echoes of the chirp signal on the high (10) channel and echoes of the chirp signal on the low (01) channel received indirectly from acoustic sensor modules 310 and 330. Acoustic sensor module 330 transmits a chirp signal on the high channel and receives an acoustic signal after the end of the reverberation period. It detects echoes of the direct chirp signal on the low (01) channel and indirect echoes of the chirp signal on the high (10) channel received from acoustic sensor module 320 using digital processing on the received acoustic signal. Acoustic sensor module 340 transmits a chirp signal on the low channel and receives an acoustic signal after the end of the reverberation period. It detects direct echoes of the direct chirp signal on the high (10) channel and indirect echoes of the chirp signal on the low (01) channel received from acoustic sensor module 330 using digital processing on the received acoustic signal.

In other embodiments, chirp signals could be used during the first measurement period, and AM signals during the second measurement period.

Dual-channel acoustic distance measurement system 300 leverages a difference between AM and chirp echoes to detect the presence of a low-height object. As noted above, AM measurements are accurate for short-distance object detection, but less accurate for long-distance object detection. However while AM can be used to detect short-distance object, their amplitudes are smaller at shorter distances when the AM signals are reflected off low-height objects. The inventors have discovered that a significant difference in amplitude of the short-distance echoes between AM and chirp echoes accurately indicates the presence of a low-height object. In particular, a low-height object echo in dual-channel AM mode has a significantly smaller amplitude compared to that in dual chirp mode at distances less than about 1 m. These distances are the distances at which detection of a low-height object, primarily a curb, becomes important.

Each acoustic sensor module analyzes the received acoustic signal by converting it to the digital domain, and analyzing the received signal in the digital domain to look for echoes from which the presence of objects and their times-of-flight can be determined. The use of two channels allows two signals overlapping in time but not in frequency to be discriminated.

Thus in general for each acoustic distance measurement, dual-channel acoustic distance measurement system 300 operates during two measurement periods. During a first measurement period, a transmitter is placed into one of the AM mode and the chirp mode and uses a first channel of the AM mode or the chirp mode, as the case may be. A first direct echo is selectively detected in the first channel of a digital received signal. A first indirect echo is selectively detected in a second channel of the digital received signal. During a second measurement period subsequent to said first measurement period, the transmitter is placed into the other one of the AM mode and the chirp mode and uses a second channel of the AM mode or the chirp mode, as the case may be. A second direct echo is selectively detected in the second channel of a digital received signal of the other one of the AM signal and the chirp signal. This pattern is repeated on alternating channels in adjacent sensors as described above/

Figure 4:
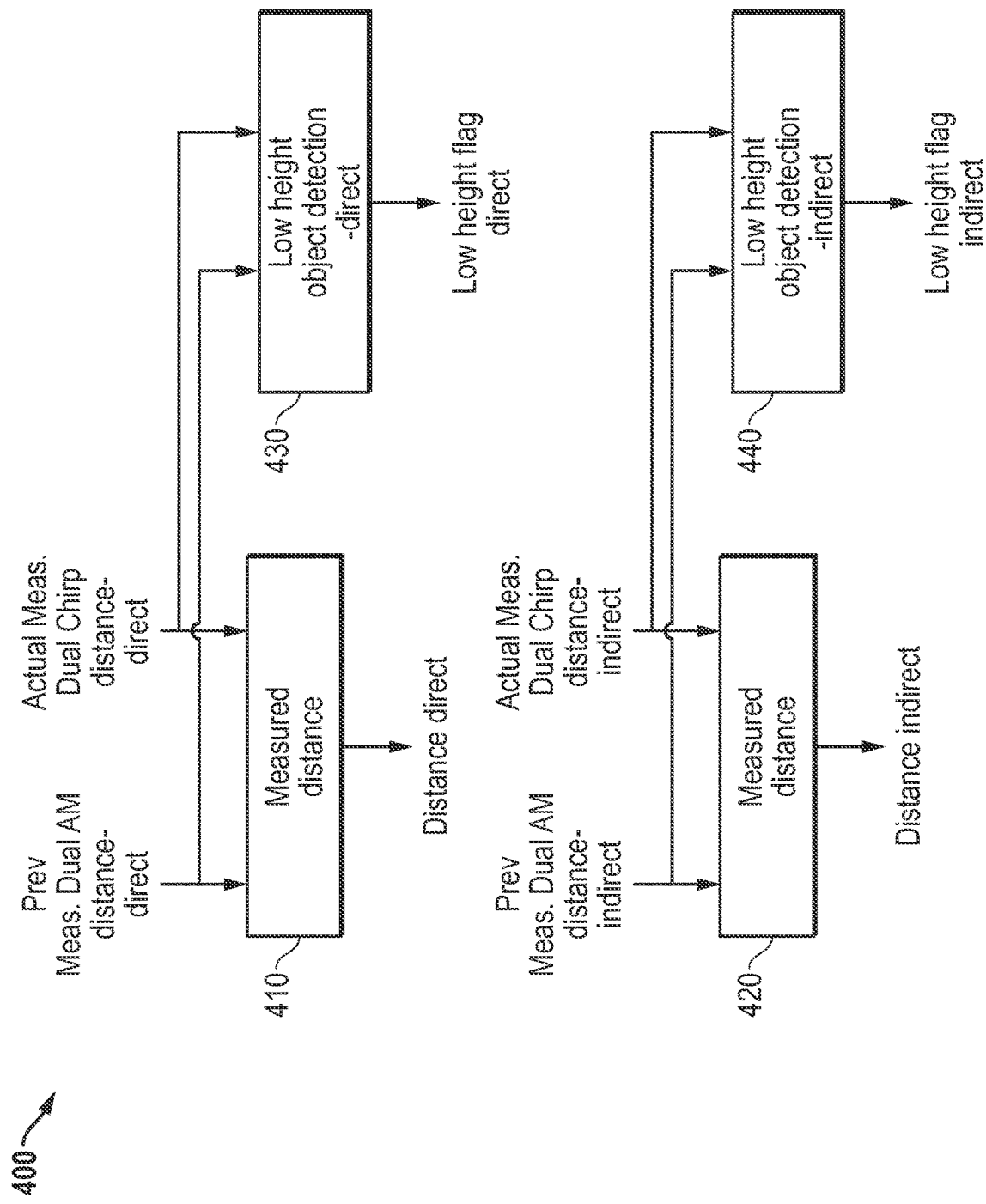
FIG. 4 illustrates in block diagram form a low-height obstacle detection system that can be used with the dual-channel acoustic distance measurement system of FIG. 3.

FIG. 4 illustrates in block diagram form a low-height obstacle detection system 400 that can be used with dual-channel acoustic distance measurement system 300 of FIG. 3. Low-height obstacle detection system 400 includes distance measurement blocks 410 and 420 and low-height object detection blocks 430 and 440. Distance measurement block 410 has a first input for receiving a previously measured dual AM direct measurement (in the present example, one measured in the first measurement period), a second input for receiving a current (or "actually") measured dual chirp direct measurement, and an output for providing a signal labelled "Distance direct". Indirect distance measurement block 420 has a first input for receiving a previously measured dual AM direct measurement (in the present example, one measured in the first measurement period), a second input for receiving a current (or "actually") measured dual chirp direct measurement, and an output for providing a signal labelled "Distance indirect". Low-height object detection block 440 uses the previous dual AM indirect distance measurement and the actual dual chirp indirect distance measurement generate an indirect low-height flag.

Low-height obstacle detection system 400 uses consecutive alternating dual AM/dual chirp measurements to detect a combination of low- and high-height objects. A low height object has an echo in dual AM mode that is measurably different than the same low-height object in chirp mode, because the low-height object echo is significantly smaller than the high-height object. This system therefore is able to effectively to detect the low-height at distances shorter the 1 m, which are distances in which detection of an approaching curb is important.

Figure 5:
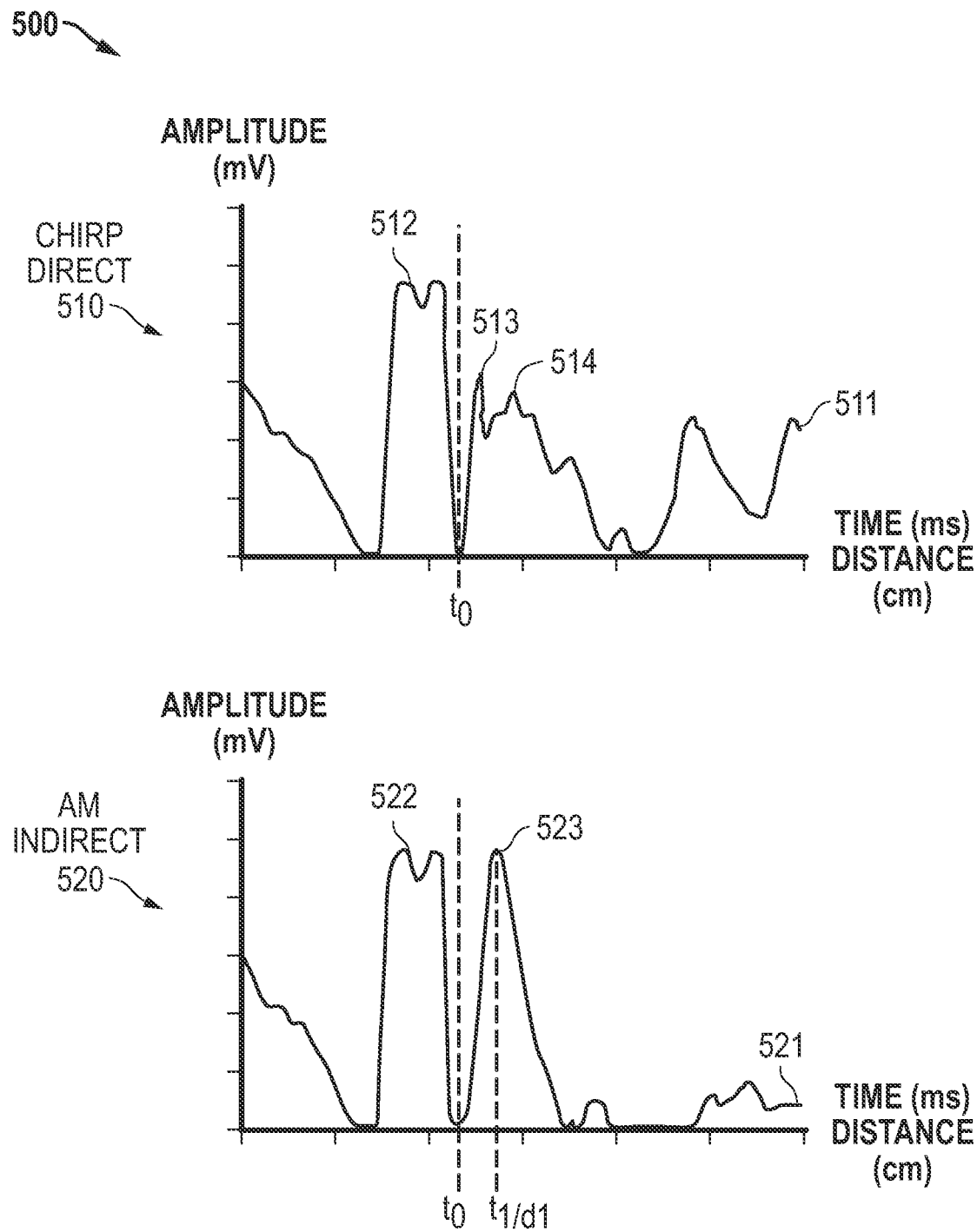
FIG. 5 illustrates timing diagrams useful in understanding the operation of the dual-channel acoustic distance measurement system of FIG. 2 for a short-distance object.

FIG. 5 illustrates a set of timing diagrams 500 useful in understanding the operation of dual-channel acoustic distance measurement system 200 of FIG. 2 for a short-distance obstacle. Timing diagrams 500 include a timing diagram 510 and a timing diagram 520. In each of timing diagrams 500, the horizontal axis represents time in milliseconds (ms) and the corresponding distance in centimeters (cm), and the vertical axis represents the amplitude in millivolts (mV). Timing diagram 510 shows a waveform 511 associated with an acoustic sensor emitting a chirp signal. The transducer emits a chirp pattern 512 that lasts until a time labelled "to", in which time to represents the end of the reverberation. After to, the transducer detects a direct echo which shows peaks 513 and 514. These peaks show the presence of a close-distance obstacle, but do not provide a reliable indication of its location because due to the complex shape of the reflection shown by peaks 513 and 514. Timing diagram 520 shows a waveform 521 with the acoustic sensor emitting a chirp signal 522 that lasts until the end of reverberation at time to. In this case, however, the acoustic sensor senses an indirect echo of an AM signal emitted by an adjacent sensor. After time to, the transducer detects the indirect echo which shows a single well-defined peak 523 that accurately identifies the time-of-flight and therefore the distance. By using data from consecutive alternating AM and chirp measurements on different channels, dual-channel acoustic distance measurement system 200 improves the precision over dual-chirp measurement alone, and an object can be accurately detected at a distance as low as approximately 16 cm.

Thus, by alternating between a direct chirp measurement and an indirect AM measurement, the close-proximity peak can be detected, but not measured using the chirp measurement, and then the consecutive indirect measurement with an AM neighbor can be used to improve the minimum distance measurement to the same performance by using an AM pulse.

Figure 6:
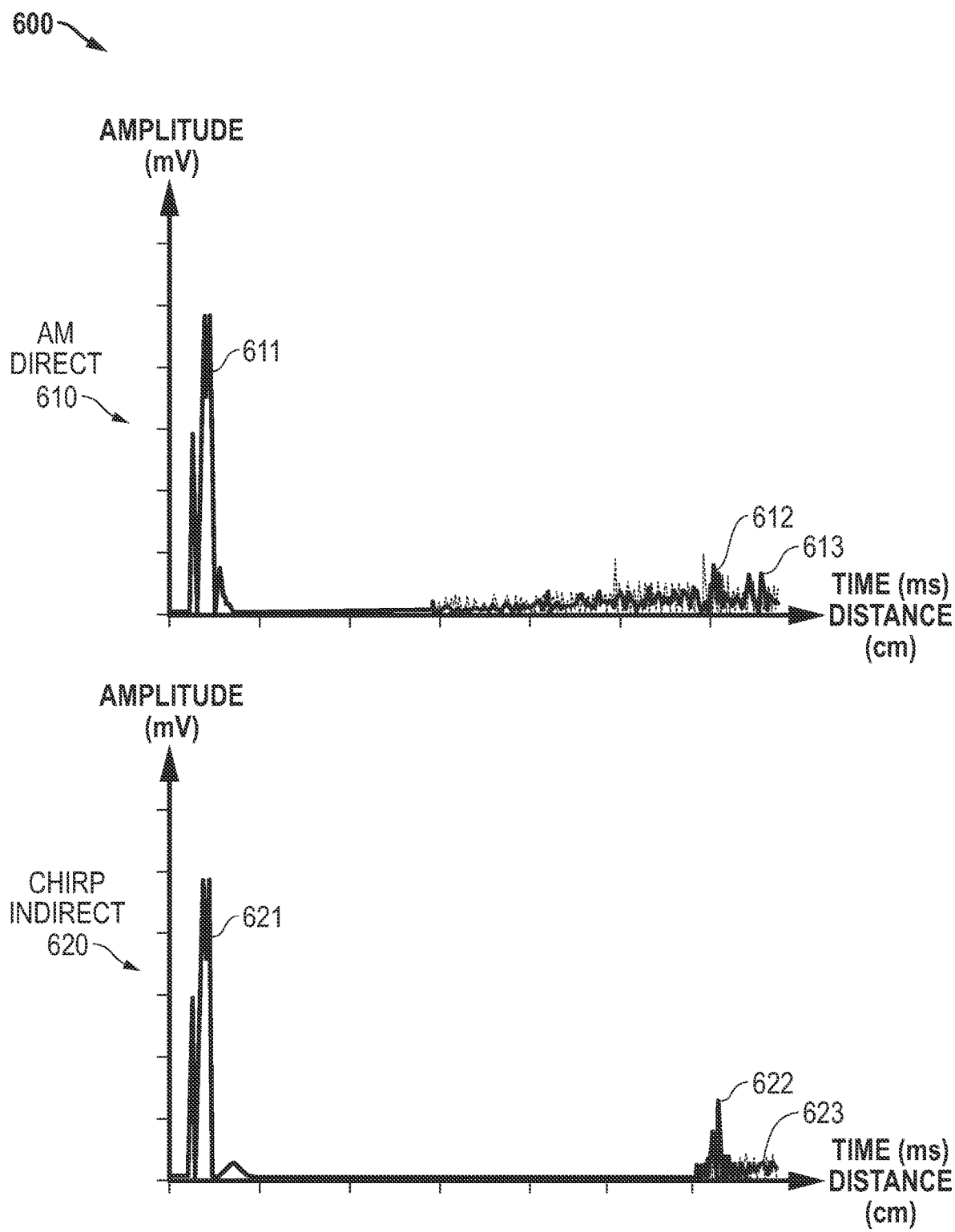
FIG. 6 illustrates timing diagrams useful in understanding the operation of the acoustic distance measurement system of FIG. 2 for a long-distance object.

FIG. 6 illustrates a set of timing diagrams 600 useful in understanding the operation of dual-channel acoustic distance measurement system 200 of FIG. 2 for a long-distance object. Timing diagrams 600 include a timing diagram 610 and a timing diagram 620. In each of timing diagrams 600, the horizontal axis represents time in ms and the corresponding distance in cm, and the vertical axis represents the amplitude in mV. Timing diagram 610 shows a waveform 611 vassociated with an acoustic sensor emitting a dual-AM signal. A long-distance obstacle causes an echo 612 to be sensed. Note that the magnitude of echo 612 is barely above the noise floor 613. However, the acoustic sensor senses a chirp in waveform 621 in indirect mode that has a peak 622 significantly higher than noise floor 623, and thus the acoustic sensor can reliably detect it. Thus, a long-distance obstacle can be reliably detected by using an indirect chip measurement.

Figure 7:
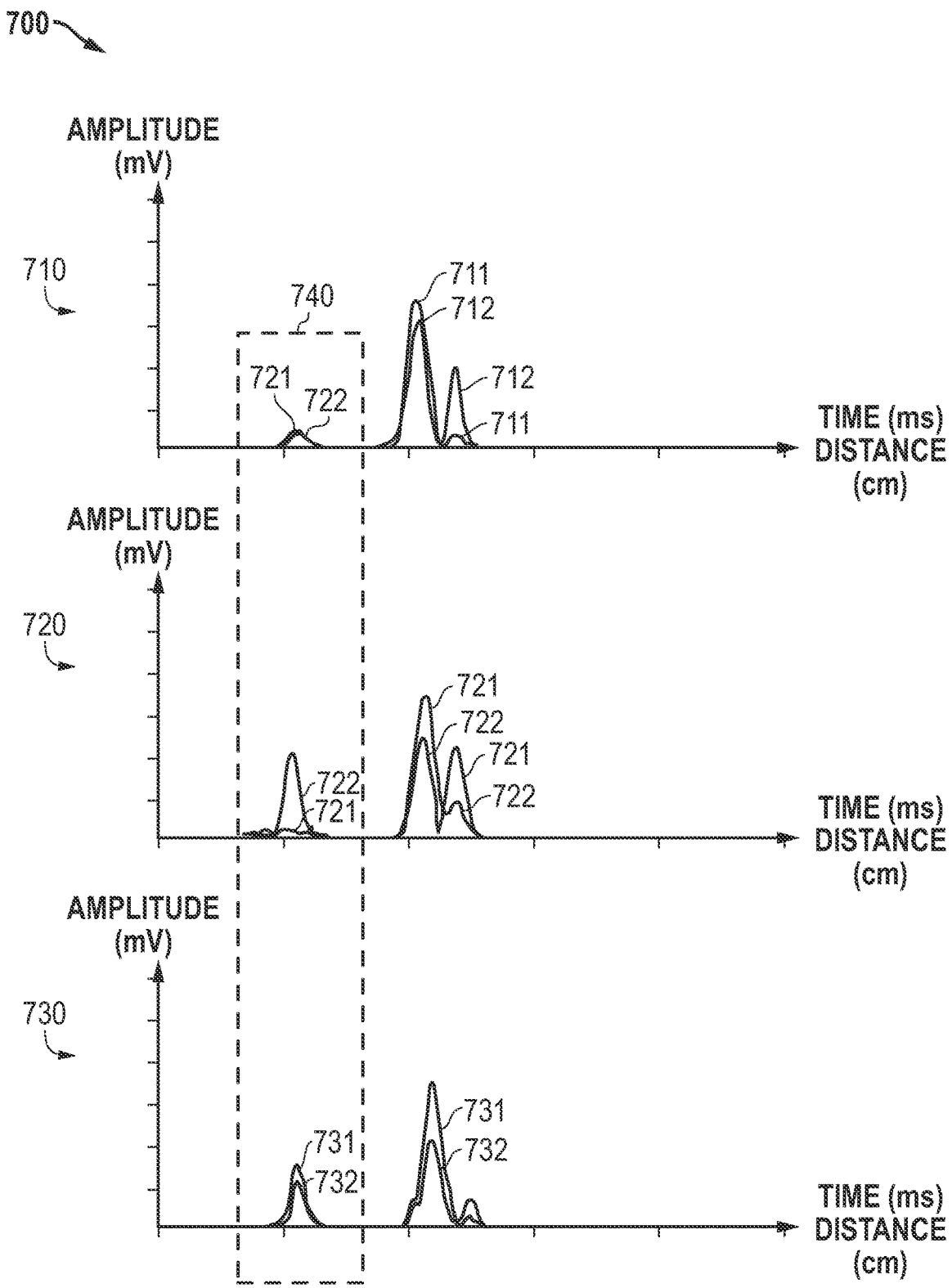
FIG. 7 illustrates a set of timing diagrams useful in understanding the operation the operation of the dual-channel acoustic distance measurement system of FIGS. 3 and 4 for a low-height object.

FIG. 7 illustrates a set of timing diagrams 700 useful in understanding the operation the operation of the dual-channel acoustic distance measurement system 300 of FIG. 3 for a low-height object. Timing diagrams 700 include a timing diagram 710, a timing diagram 720, and a timing diagram 730. In each of timing diagrams 700, the horizontal axis represents time in microseconds (μs) and the corresponding distance in centimeters (cm), and the vertical axis represents the amplitude in volts (V). A time window 740 corresponds to the time-of-flight and distance between the acoustic distance measurement circuit and a low height object at various times-of-flight and distances.

Timing diagram 710 shows a waveform 711 associated with an AM direct signal and a waveform 712 associated with a chirp direct signal and corresponds to a low-height object such as a curb located 0.6 m from the acoustic distance measurement circuit with a high-height object behind it. Within a timing window 740, acoustic distance measurement circuits emitting an AM signal and a dual-chirp signal receive small direct echoes that are barely distinguishable from the noise floor and from each other. However, both the AM direct echo signal and the chirp direct echo signal indicate the presence of the high-height object at about the same distance.

Timing diagram 720 shows a waveform 721 associated with an AM direct signal and a waveform 722 associated with a chirp direct signal and corresponds to a low-height object such as a curb located 0.8 m from the acoustic distance measurement circuit with a high-height object behind it. Waveforms 721 and 722 have been shifted so that the direct echoes of the low-height object will both occur at corresponding points within timing window 740. The acoustic distance measurement circuit emitting the AM signal still receives a small direct echo that is barely distinguishable from the noise floor. However, the acoustic distance measurement circuit emitting the chip signal is able to measure a significant echo in the low-height obstacle. Moreover, the difference in amplitudes between the chirp signal and AM signal indicates it to be a low-height object. Thus, low-height object detection block 430 in low-height obstacle detection system 400 outputs the LOW HEIGHT FLAG DIRECT signal, allowing the system controller such as ECU 104 to alert the driver that a low-height object was detected.

Both the AM direct echo signal and the chirp direct echo signal, however, indicate the presence of the high-height object at about the same distance.

Timing diagram 730 shows a waveform 731 associated with an AM direct signal and a waveform 732 associated with a chirp direct signal and corresponds to a low-height object such as a curb located 1.0 m from the acoustic distance measurement circuit with a high-height object behind it. Waveforms 731 and 732 have been shifted so that the direct echoes of the low-height object will both occur at corresponding points within timing window 740. In timing diagram 730, the acoustic distance measurement circuit emitting the AM signal receives a direct echo that has about the same peak amplitude as the chirp echo. Both the AM direct echo signal and the chirp direct echo signal, however, indicate the presence of the high-height object at about the same distance.

At the same time, the acoustic distance measurement circuit receives alternate indirect echoes. Although not shown in FIG. 7, the received indirect echo signals exhibit the same relative characteristics, allowing the system to alert the driver to the presence of the low-height object around 0.8 m.

In a normal driving situation in which the driver is parking the vehicle, the acoustic distance measurement system can detect the presence of the low-height object, such as a curb, when the object is relatively far away from the vehicle, and alert the driver of the existence of the low-height object as he or she approaches it, allow him or her enough time to take appropriate corrective action, even in the presence of a high-height object behind the low-height object.

Figure 8:
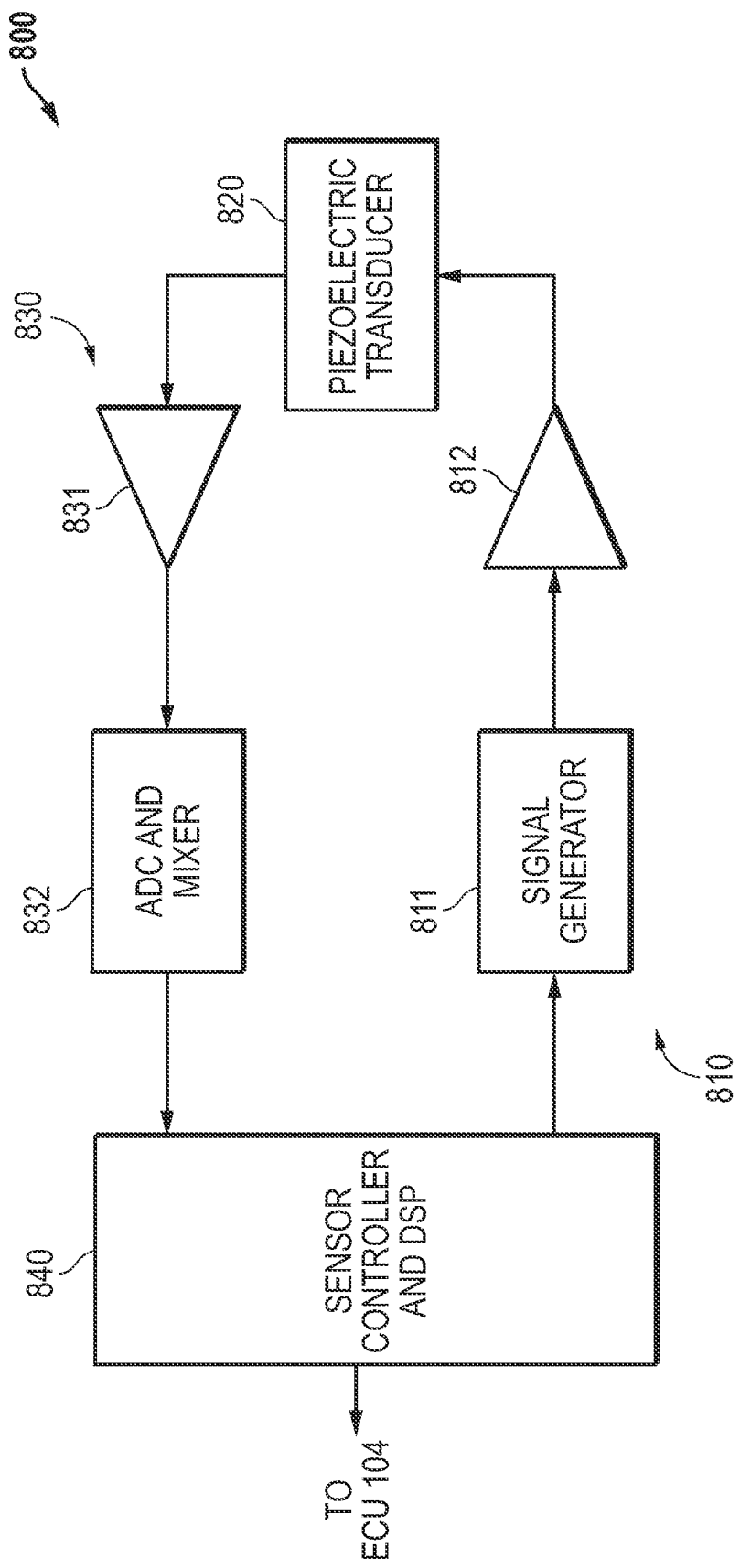
FIG. 8 illustrates in block diagram form an acoustic distance measurement circuit according to various embodiments of the present disclosure.

FIG. 8 illustrates in block diagram form an acoustic distance measurement circuit 800 according to various embodiments of the present disclosure. Acoustic distance measurement circuit 800 includes a transmitter 810, an acoustic transducer 820, a receiver 830, and a sensor controller and digital signal processor 840.

Transmitter 810 includes a signal generator 811 and a transmitter amplifier 812. Signal generator 811 has an input, and an output for providing a selected one of a dual AM signal and a dual chirp signal. Transmitter amplifier 812 has an input connected to the output of signal generator 811, and an output adapted to be connected to acoustic transducer 820.

Receiver 830 includes a receiver amplifier 831, and a mixer 832. Receiver amplifier 831 has an input adapted to be connected to acoustic transducer 820, and an output. Mixer circuit 832 has an input coupled to the output of receiver amplifier 831, and an output for providing a digital received signal. Sensor controller and digital signal processor 840 has an input connected to the output of receiver 830, an output connected to the input of transmitter 810, and provides an output to ECU 104 to allow ECU 104 to signal proper alarms to the driver.

In operation, sensor controller and digital signal processor 840 is operative to set transmitter 810 into one of the AM mode and the chirp mode, and capture a received signal during an echo period. Sensor controller and digital signal processor 840 analyzes the digital received signal to selectively detect a direct echo on the first channel and an indirect echo on the second channel. When detecting low-height objects, sensor controller and digital signal processor 840 is further operative during a second measurement period subsequent to the first measurement period to place transmitter 810 into another one of said AM mode and said chirp mode, i.e., in the opposite mode as the mode used in the first measurement period, and to selectively detect a second direct echo in the first channel of the digital received signal of the other one of the AM signal and the chirp signal, and selectively detect a second indirect echo in the second channel of the digital received signal of the same one of the AM signal and the chirp signal used in the first measurement period. In exemplary embodiments, each of the first and second measurement periods take about 40 milliseconds (ms).

In the exemplary embodiment, sensor controller and digital signal processor 840 performs the DSP-related tasks including digital filtering and correlation of the received echoes to the AM and chirp patterns, as well as scaling the magnitudes and performing noise filtering. In other embodiments, however, various parts of the signal analysis functions can be performed by the vehicle controller, e.g., ECU 104.

Figure 9:
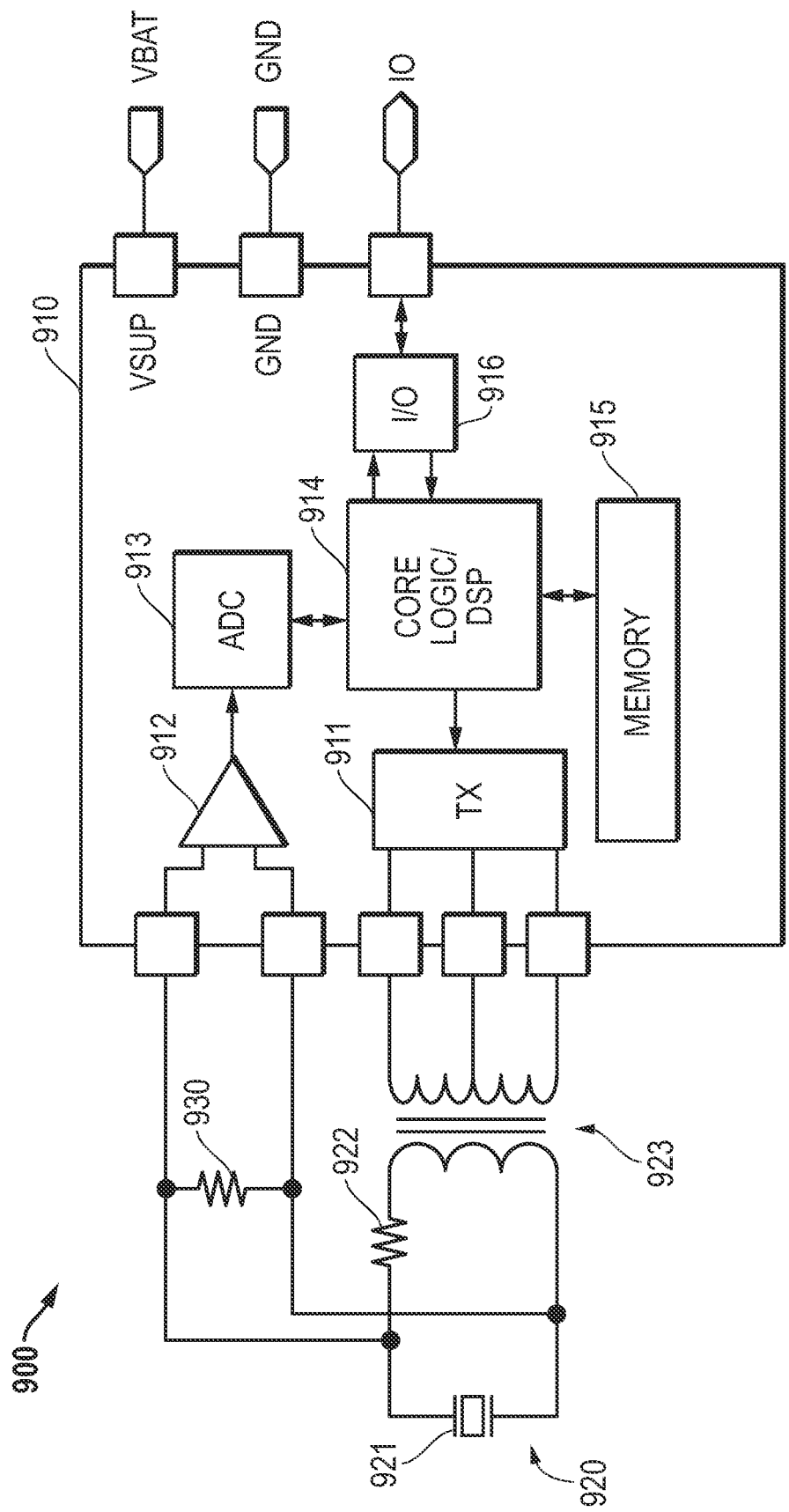
FIG. 9 illustrates in block diagram form an integrated circuit that implements the acoustic distance measurement circuit of FIG. 8 according to various embodiments of the present disclosure.

FIG. 9 illustrates in block diagram form an acoustic distance measurement circuit 900 with an integrated circuit 910 that implements portions of acoustic distance measurement circuit 800 FIG. 8 according to various embodiments. Acoustic distance measurement circuit 900 includes generally an integrated circuit 910, a transducer driver interface circuit 920, and a resistor 930.

In the illustrated embodiment, integrated circuit 910 is a monolithic silicon chip that may be packaged for mounting or soldering to a printed circuit board connecting the device contacts to other electronic components or wire connectors. As shown in FIG. 9, integrated circuit 910 is connected to two power supply terminals, VBAT and GND, and has a single input/output line labelled "I/O" for bidirectional communication with ECU 104, three terminals for connection to transducer driver interface circuit 920, and two terminals connected to piezoelectric transducer 921, in which resistor 930 is connected between the two terminals. Integrated circuit 910 includes generally a transmitter 911 labelled "TX", a receiver amplifier 912, an analog-to-digital converter (ADC0), 913, a core logic and DSP block 914, a memory 915, and an I/O controller 916.

Transmitter 911 corresponds to transmitter 810 of FIG. 8 and has an input, and an output connected to a piezoelectric transducer 921 through a transformer 923 having connections to two ends of a winding, and a connection to a center tap. Receiver 912 corresponds to receiver amplifier 831 of FIG. 8 and has a first input connected to the first terminal connected to piezoelectric transducer 921, a second input connected to the second terminal of piezoelectric transducer 921, and an output. ADC 913 corresponds to the ADC in ADC and mixer 832 of FIG. 8 and has an input connected to the output of receiver 912, and an output. Core logic and DSP block 914 has an input connected to the input of transmitter 911, a bidirectional connection to ADC 913, a signal output, a signal input, and a bidirectional connection to a memory 915. Memory 915 has storage locations for storing programs, firmware, data, and the like and is bidirectionally connected to core logic and DSP block 914. I/O controller 916 has an input connected to the signal output of core logic and DSP block 914, an output connected to the signal input of core logic and DSP block 914, and a bidirectional connection to the I/O terminal of integrated circuit 910.

Core logic and DSP block 914 controls the sequence of operations according to the techniques and operations described above. It reports measurement results to a vehicle controller, such as ECU 104, which then combines the measurements from multiple acoustic sensor modules to provide accurate acoustic distance measurements over a wide range of obstacles from 16 cm to 5 m In order to facilitate this operation, core logic and DSP block 914 performs some signal analysis on the digital received signals to detect AM and chirp received signal strengths that can be used to detect echo times and obstacle times-of-flight. To facilitate these operations, it discriminates echoes in the digital received signals using correlators to selected channels of the dual channel AM and dual channel chirp signals. An example of a DSP-based processing engine capable of performing all these operations is described in US 2021/0352412, but other DSP processing engines are possible and would be apparent to those skilled in the art.

The above-disclosed subject matter is to be considered illustrative, and not restrictive, and the appended claims are intended to cover all such modifications, enhancements, and other embodiments that fall within the scope of the claims. For example, the signal processing functions to recognize a valid echo off an obstacle within the range of the sensor, determine time-of-flight, and determine distance may be done by the acoustic sensor itself, or by a vehicle control unit, or by various combinations of the two. The vehicle control unit may be part of another control unit, such as an engine control unit (ECU), a body control unit (BCU), an infotainment controller, and the like. While the embodiments were described with respect to an automobile having four rear sensors and four forward sensors, other numbers of sensors and locations for the sensors are possible. The overall function of the acoustic distance measurement system could be for a parking assist sensor (PAS), a forward recognition camera, a collision detection system, and the like. Moreover, while they both leverage dual-channel, dual mode distance detection techniques, the range enhancements and low-height objection detection systems may be used together or individually.

Thus, to the maximum extent allowed by law, the scope of the present invention is to be determined by the broadest permissible interpretation of the following claims and their equivalents, and shall not be restricted or limited by the forgoing detailed description.

What is claimed is:

1. An acoustic distance measuring circuit, comprising:
   a transmitter having an output adapted to be coupled to an acoustic transducer for providing a selected one of an amplitude-modulation (AM) signal in an AM mode and a chirp signal in a chirp mode;
   a receiver having an input adapted to be coupled to said acoustic transducer, and an output for providing a digital received signal; and
   a controller operative during a first measurement period to:
      place said transmitter into one of said AM mode and said chirp mode using a first channel, selectively detect a first direct echo in said first channel of said digital received signal of said one of said AM signal and said chirp signal, and selectively detect a first indirect echo in a second channel of said digital received signal of another one of said AM signal and said chirp signal.

2. The acoustic distance measuring circuit of claim 1, further comprising:
   a vehicle control unit coupled to said controller,
   wherein said controller is further operative to transmit information about times-of-flight of both said first direct echo and said first indirect echo to said vehicle control unit, and said vehicle control unit is responsive to said information to determine a distance of an obstacle from a vehicle.

3. The acoustic distance measuring circuit of claim 2, wherein, further comprising:
   a second transmitter having an output adapted to be coupled to a second acoustic transducer for providing said selected one of said AM signal in said AM mode and said chirp signal in said chirp mode;
   a second receiver having an input adapted to be coupled to said second acoustic transducer, and an output for providing a second digital received signal; and
   a second controller operative during said first measurement period to:
      place said second transmitter into said other one of said AM mode and said chirp mode using said second channel, selectively detect a second direct echo in said second channel of said digital received signal of said other one of said AM signal and said chirp signal, and selectively detect a second indirect echo in said first channel of said digital received signal of said one of said AM signal and said chirp signal.

4. The acoustic distance measuring circuit of claim 3, wherein:
   said second controller is further operative to transmit second information about times-of-flight of both said second direct echo and said second indirect echo to said vehicle control unit, and said vehicle control unit is further responsive to said second information to determine said distance of said obstacle from said vehicle.

5. The acoustic distance measuring circuit of claim 1, wherein said transmitter comprises:
   a signal generator having an output for providing said selected one of said amplitude-modulation (AM) signal and said chirp signal; and
   a transmitter amplifier having an input coupled to the output of the signal generator, and output adapted to be coupled to said acoustic transducer.

6. The acoustic distance measuring circuit of claim 1, wherein said receiver comprises:
   a receiver amplifier having an input adapted to be coupled to said acoustic transducer, and an output; and
   a mixer circuit having an input coupled to said output of said receiver amplifier, and an output for providing said digital received signal.

7. The acoustic distance measuring circuit of claim 1, wherein said transmitter, said receiver, and said controller are combined on a single monolithic integrated circuit.

8. The acoustic distance measuring circuit of claim 1, wherein:
   said controller is further operative, during a second measurement period subsequent to said first measurement period, to:
      place said transmitter into said other one of said AM mode and said chirp mode using said first channel, selectively detect a second direct echo in said first channel of said digital received signal of said other one of said AM signal and said chirp signal, and selectively detect a second indirect echo in said second channel of said digital received signal of said one of said AM signal and said chirp signal.

9. The acoustic distance measuring circuit of claim 8, further comprising:
   a vehicle control unit coupled to said controller,
   wherein said controller is further operative to transmit information about times-of-flight of said first direct echo, said second direct echo, said first indirect echo, and said second indirect echo to said vehicle control unit, and said vehicle control unit is responsive to said information to determine a distance of a low-height obstacle from a vehicle.

10. The acoustic distance measuring circuit of claim 9, wherein, further comprising:
a second transmitter having an output adapted to be coupled to a second acoustic transducer for providing said selected one of said AM signal in said AM mode and said chirp signal in said chirp mode;
a second receiver having an input adapted to be coupled to said second acoustic transducer, and an output for providing a second digital received signal; and
a second controller operative during said first measurement period to:
place said second transmitter into said one of said AM mode and said chirp mode using said second channel, selectively detect a third direct echo in said first channel of said second digital received signal of said one of said AM signal and said chirp signal, and selectively detect a third indirect echo in said second channel of said digital received signal of said one of said AM signal and said chirp signal, and
during said second measurement period to:
place said second transmitter into said other one of said AM mode and said chirp mode using said second channel, selectively detect a fourth direct echo in said second channel of said digital received signal of said other one of said AM signal and said chirp signal, and selectively detect a fourth indirect echo in said second channel of said second digital received signal of said one of said AM signal and said chirp signal.

11. The acoustic distance measuring circuit of claim 10, wherein:
said second controller is further operative to transmit second information about times-of-flight of both said second direct echo and said second indirect echo to said vehicle control unit, and said vehicle control unit is further responsive to said second information to determine a distance of said low-height obstacle from said vehicle.

12. The acoustic distance measuring circuit of claim 8, wherein said transmitter comprises:
a signal generator having an output for providing said selected one of said amplitude-modulation (AM) signal and said chirp signal; and
a transmitter amplifier having an input coupled to the output of the signal generator, and output adapted to be coupled to said acoustic transducer.

13. The acoustic distance measuring circuit of claim 8, wherein said receiver comprises:
a receiver amplifier having an input adapted to be coupled to said acoustic transducer, and an output; and
a mixer circuit having an input coupled to said output of said receiver amplifier, and an output for providing said digital received signal.

14. The acoustic distance measuring circuit of claim 8, wherein said first channel occupies a different frequency band than said second channel.

15. A method of measuring an acoustic distance of an obstacle from a vehicle, comprising:
providing a selected one of an amplitude-modulation (AM) signal in an AM mode and a chirp signal in a chirp mode using a transmitter adapted to be coupled to an acoustic transducer;
receiving a digital received signal using a receiver adapted to be coupled to said acoustic transducer;

during a first measurement period:
placing a transmitter into one of said AM mode and said chirp mode using a first channel;
selectively detecting a direct echo in said first channel of said digital received signal of said one of said AM signal and said chirp signal; and
selectively detect an indirect echo in a second channel of said digital received signal of another one of said AM signal and said chirp signal.

16. The method of claim 15, further comprising:
transmitting information about times-of-flight of both said direct echo and said indirect echo using a controller; and
determining a distance of the obstacle from the vehicle responsive to said information using a vehicle control unit.

17. The method of claim 15, further comprising:
providing said selected one of said AM signal in said AM mode and said chirp signal in said chirp mode using a second transmitter having an output adapted to be coupled to a second acoustic transducer;
providing a second digital received signal using a second receiver having an input adapted to be coupled to said second acoustic transducer;
during said first measurement period:
placing said second transmitter into said other one of said AM mode and said chirp mode using said second channel;
selectively detecting a second direct echo in said second channel of said digital received signal of said other one of said AM signal and said chirp signal; and
selectively detecting a second indirect echo in said first channel of said digital received signal of said one of said AM signal and said chirp signal.

18. The method of claim 17, further comprising:
transmitting information about times-of-flight of both said direct echo and said indirect echo using a controller adapted to be coupled to a vehicle control unit;
transmitting second information about times-of-flight of both said second direct echo and said second indirect echo to said vehicle control unit; and
determining a distance of the obstacle from the vehicle responsive to said information and said second information.

19. The method of claim 15, wherein said first channel occupies a different frequency band than said second channel.

20. A method of measuring a distance of a low-height obstacle from a vehicle, comprising:
providing a selected one of an amplitude-modulation (AM) signal in an AM mode and a chirp signal in a chirp mode using a transmitter adapted to be coupled to an acoustic transducer;
receiving a digital received signal using a receiver adapted to be coupled to said acoustic transducer; and
during a first measurement period:
placing said transmitter into said one of said AM mode and said chirp mode using a first channel;
selectively detecting a first direct echo in said first channel of said digital received signal of said one of said AM signal and said chirp signal; and
selectively detecting a first indirect echo in a second channel of said digital received signal of said one of said AM signal and said chirp signal, and
during a second measurement period subsequent to said first measurement period:

placing said transmitter into another one of said AM mode and said chirp mode using said first channel;

selectively detecting a second direct echo in said first channel of said digital received signal of another one of said AM signal and said chirp signal; and selectively detecting a second indirect echo in said second channel of said digital received signal of said one of said AM signal and said chirp signal.

21. The method of claim 20, further comprising:

transmitting information about times-of-flight of said first direct echo, said first indirect echo, said second direct echo, and said second indirect echo using a controller; and determining the distance of the low-height obstacle from the vehicle responsive to said information using a vehicle control unit.

22. The method of claim 20, wherein, further comprising:

providing a selected one of a second amplitude-modulation (AM) signal in said AM mode and a second chirp signal in said chirp mode using a second transmitter adapted to be coupled to said acoustic transducer;

receiving a second digital received signal using a second receiver adapted to be coupled to said acoustic transducer;

during said first measurement period:

placing said second transmitter into said one of said AM mode and said chirp mode using said second channel;

selectively detecting a third direct echo in said second channel of said second digital received signal of said one of said AM signal and said chirp signal; and selectively detecting a third indirect echo in said second channel of said second digital received signal of said one of said AM signal and said chirp signal, and during said second measurement period:

placing said second transmitter into said other one of said AM mode and said chirp mode using said second channel;

selectively detecting a fourth direct echo in said second channel of said second digital received signal of said other one of said AM signal and said chirp signal; and selectively detecting a fourth indirect echo in said second channel of said digital received signal of said one of said AM signal and said chirp signal.

23. The method of claim 22, further comprising:

transmitting first information about times-of-flight of said first direct echo, said first indirect echo, said second direct echo, and said second indirect echo using a first controller adapted to be coupled to a vehicle control unit;

transmitting second information about times-of-flight of said third direct echo, said third indirect echo, said fourth direct echo, and said fourth indirect echo using a second controller adapted to be coupled to said vehicle control unit; and determining the distance of the low-height obstacle from the vehicle responsive to said first information and said second information using said vehicle control unit.

24. The method of claim 20, wherein said first channel occupies a different frequency band than said second channel.

* * * * *